Nov. 23, 1948. P. S. CARTER Re. 23,051

BROADCAST ANTENNA

Original Filed Dec. 10, 1941

INVENTOR
Philip S. Carter
BY H. S. Grover
ATTORNEY

Reissued Nov. 23, 1948 Re. 23,051

UNITED STATES PATENT OFFICE 23,051

BROADCAST ANTENNA

Philip S. Carter, Rocky Point, N. Y., assignor to Radio Corporation of America, a corporation of Delaware Original No. 2,403,909, dated July 16, 1946, Serial No. 422,356, December 10, 1941. Application for reissue September 8, 1948, Serial No. 48,306

19 Claims. (Cl. 250—33.63)

Figures 1, 2:
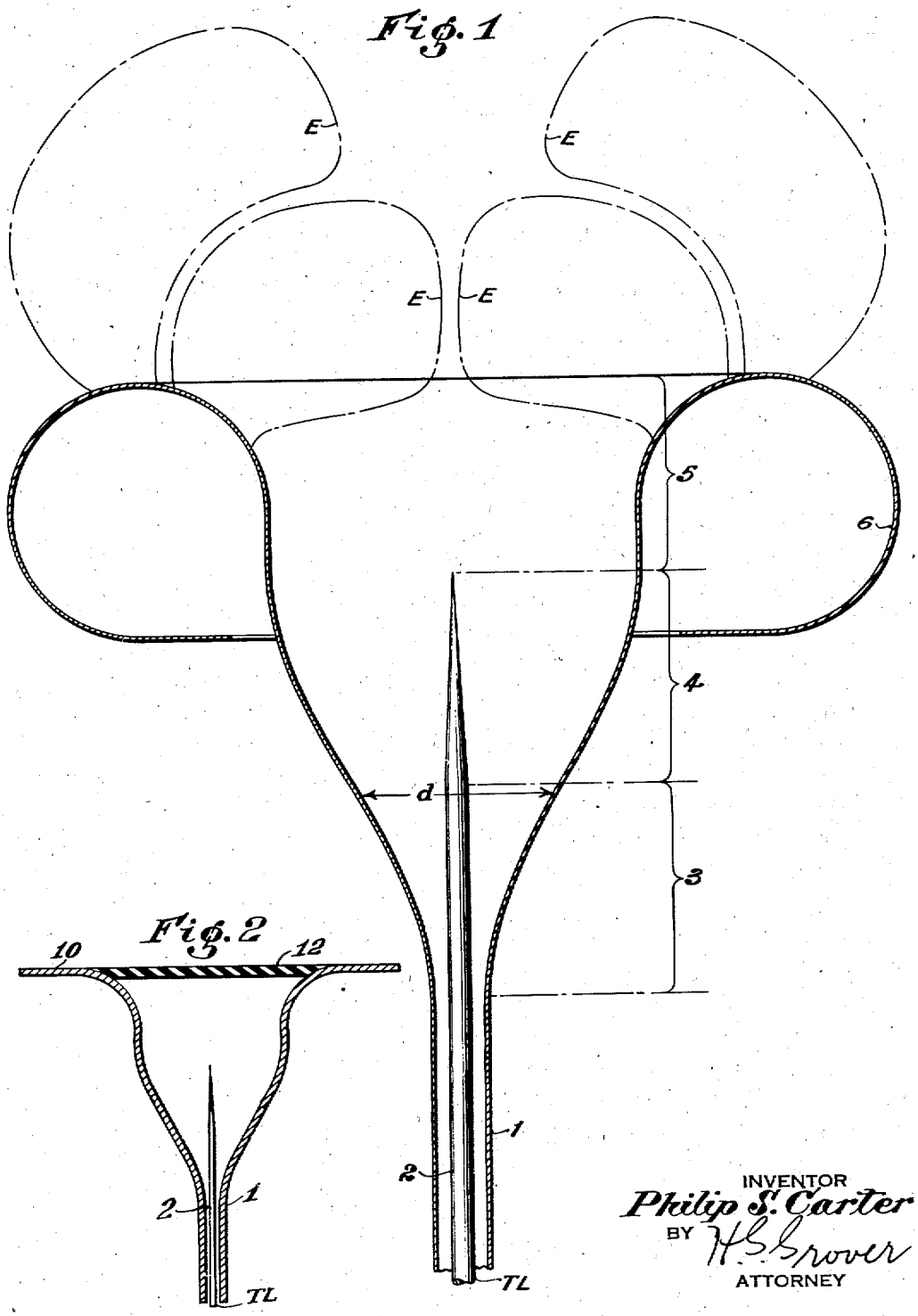

The present invention relates to antennae for radiating vertically polarized short wave energy.

An object of the present invention is the provision of a broad band antenna for vertically polarized waves which does not use a vertically projecting radiating conductor.

Another object is the provision of a simple, easily constructed radiator for vertically polarized waves which is capable of operating without discrimination over a wide band of frequencies.

A further object is the provision of an antenna which may be arranged flush with the surface of a conducting ground sheet such as a flat metallic roof of a building.

Still a further object is the provision of an antenna for vertically polarized waves in which it is not required that any portion thereof project above the surface of the ground.

The foregoing objects, and others which may appear from the following detailed description, are attained by expanding the electric field within a concentric transmission line connected to a high frequency energy source by expanding the outer conductor of the line and by contracting the inner conductor to a point until propagation takes place without the inner conductor. The field is then further expanded by flaring the outer conductor until the field may be propagated smoothly away from the system in a plane normal to the axis of the transmission line and substantially uniformly in all directions in that plane. Conversely, the antenna is operative for reception of radiant energy, the tapered portions acting to successively contract the field until it may be carried along the transmission line to a receiver.

The present invention will be more completely understood by reference to the following detailed description which is accompanied by a drawing in which Figure 1 illustrates an embodiment of the present invention and Figure 2 illustrates a modification thereof. In Fig. 1 I have shown a concentric cable transmission line TL composed of an outer shell conductor 1 and an inner central conductor 2. One end of the transmission line is connected to a source of high frequency energy (not shown) and the other end which is to also serve as a radiator, is preferably vertically disposed. This end of the transmission line is divided into a plurality of consecutive zones in each of which different operations are performed on the wave to be radiated. In the first zone, identified by reference numeral 3, the outer conductor is expanded in diameter until its diameter $d$ is greater than that value for which $$J_0\frac{(\pi d)}{\lambda}=0$$

where $J_0$ is the zero order Bessel function of the first kind, that is $$\frac{d}{\lambda}$$

is greater than .77 (approximately) and $\lambda$ is the operating wavelength. The inside conductor is then, as shown in zone 4, gradually tapered down to zero, while the outside conductor may remain of constant diameter, or it may continue to expand. Finally, in zone 5, the outer conductor is further expanded and flared like a trumpet, at last curving around back on itself, as indicated at 6. The changing dimensions cause the electric field of the wave in the concentric line to gradually expand first in zone 3 by expansion of the outer conductor and then in zone 4 by contraction of the inner conductor until, in zone 5, propagation takes place without the inner conductor. The electric field then is expanded further in zone 5 and is propagated away from the system horizontally as indicated by the electric lines of force E. No propagation takes place vertically.

The foregoing description has been predicated on the assumption that the end of the transmission line is vertically disposed. Of course, if desired, the system may be adapted to radiate horizontally polarized energy by disposing the upper face of the expanded portion of the transmission line vertically, instead of horizontally, as shown.

While the extreme end portion of the outer conductor has been shown as curving around back on itself in Fig. 1, it is within the scope of the present invention to simply extend the flared portion out horizontally in the form of a conducting ground sheet 10, as shown in Fig. 2, the ground sheet 10 may be either the metallic top of a flat roofed building or the actual surface of the ground. This form of construction is particularly useful when it is desired to radiate vertically polarized waves of ultra-short wavelengths from certain predetermined locations in the midst of an airport, for example, where any projections would constitute a hazard to planes landing and taking off. In this form of construction it is preferred that the open flared end of the outer conductor be closed in with as thin as possible a sheet of dielectric material such as that indicated by reference character 12 in order to provide protection against the elements and to present a smooth overall surface. The closure should be thin in order not to cause excessive losses or distortion of the field. Furthermore, while only a single radiator element has been shown and described, it should be clearly understood that a plurality of elements may be so disposed as to obtain directivity in the horizontal plane by arranging said elements so that energy from the elements is in a phase additive relationship in the desired direction.

While I have shown and particularly described several embodiments of my invention, it is to be distinctly understood that my invention is not limited thereto but that modifications within the scope of my invention may be made.

I claim:

1. A system for radiating or receiving electromagnetic waves with substantially uniform intensity in all directions normal to a given axis comprising a concentric transmission line lying along said axis and having an outer shell and an inner conductor connected to a wave energy transducer, said outer shell being flared out in a trumpet-like formation, said inner conductor being tapered to a point and entirely contained within said flared outer shell.

2. A system for radiating or receiving electromagnetic waves comprising a concentric transmission line having an outer shell and an inner conductor connected to a wave energy transducer, said outer shell being flared out in a trumpet-like formation, said inner conductor being tapered to a point and entirely contained within said flared outer shell, the longitudinal axis of said line being vertically disposed whereby said system is uniformly responsive in the horizontal plane to vertically polarized waves.

3. A system for radiating or receiving electromagnetic waves comprising a concentric transmission line having an outer shell and an inner conductor connected to a wave energy transducer, said inner conductor being tapered to a point and entirely contained within said outer shell said outer shell being so flared out in a trumpet-like formation with the outer end of the shell curved back on itself that the field within said shell is smoothly converted to a field extending substantially uniformly in all directions normal to the axis of the flared portion of the said shell.

4. A system for radiating or receiving electromagnetic waves comprising a concentric transmission line having an outer shell and an inner conductor connected to a wave energy transducer, said outer shell being flared out in a trumpet-like formation with the outer end of said shell curved back on itself, said inner conductor being tapered to a point and entirely contained within said flared outer shell, the longitudinal axis of said line being vertically disposed whereby said system is uniformly responsive in the horizontal plane to vertically polarized waves.

5. A system for radiating electromagnetic waves comprising a concentric transmission line having its longitudinal axis vertically disposed and said line including an outer shell and an inner conductor connected to a wave energy source, said inner conductor being tapered to a point entirely within said outer shell, said outer shell being so flared out in a trumpet-like formation that vertically polarized energy is radiated uniformly in all directions in the horizontal plane.

6. A system for radiating electomagnetic waves comprising a concentric transmission line having an outer shell and an inner conductor connected to a wave energy source, said outer shell being flared out in a trumpet-like formation with the outer end of said shell curved back on itself, said inner conductor being tapered to a point within said flared outer shell, the flare of said outer shell being so proportional that the field within said shell is smoothly converted to a field extending substantially uniformly in all directions normal to the axis of the flared portion of said shell.

7. A system for radiating electromagnetic waves comprising a concentric transmission line having an outer shell and an inner conductor connected to a wave energy source, said outer shell being flared out in a trumpet-like formation with the outer end of said shell curved back on itself, said inner conductor being tapered to a point and entirely contained within said outer shell, the longitudinal axis of said line being vertically disposed whereby vertically polarized energy is radiated uniformly in all directions in the horizontal plane.

8. In a radiant energy system, a concentric transmission line having an outer shell and an inner conductor, said outer shell being smoothly expanded in its transverse dimension along a portion of the length of said line until the propagation of the field within said shell may take place without said inner conductor, said inner conductor being tapered to a point, said outer conductor thereafter being so flared out that said field is freed from said system and is propagated in all directions normal to the length of said line.

9. In a radiant energy system, a concentric transmission line having an outer shell and an inner conductor, said outer shell being smoothly expanded in its transverse dimension along a portion of the length of said line until the propagation of the field within said shell may take place without said inner conductor, said inner conductor being tapered to a point, said outer conductor thereafter being flared out until said field is free from said system, the flare of said shell being continued so that the end of said shell is curved back on itself.

10. In a radiant energy system, a concentric transmission line having an outer shell and an inner conductor, said outer shell being smoothly expanded in its transverse dimension along a portion of the length of said line until the propagation of the field within said shell may take place without said inner conductor, said inner conductor being tapered to a point along the next adjacent length of said line, said outer conductor thereafter along the length of said line being flared out until said field is free from said system.

11. In a radiant energy system, a concentric transmission line having an outer shell and an inner conductor, said outer shell being smoothly expanded in its transverse dimension along a portion of the length of said line until the propagation of the field within said shell may take place without said inner conductor, said inner conductor being tapered to a point along the next adjacent length of said line, said outer conductor thereafter along the length of said line being flared out until said field is free from said system, the flare of said shell being continued so that the end of said shell is curved back on itself.

12. In a radiant energy system, a concentric transmission line having an outer shell and an inner conductor, said outer shell being smoothly expanded in its diameter $d$ along a portion of the length of said line until said diameter is greater than that value for which $$J_0\left(\frac{\pi d}{\lambda}\right)=0$$

where $J_0$ is the zero order Bessel function of the first kind, that is, $$\frac{d}{\lambda}>.77$$

where $\lambda$ is the operating wavelength whereby propagation of the field within said shell may take place without said inner conductor, said inner conductor being tapered to a point along the next adjacent length of said line and said outer conductor thereafter along the length of said line being flared out until said field is free from said system.

13. In a radiant energy system, a concentric transmission line having an outer shell and an inner conductor, said outer shell being smoothly expanded in its diameter $d$ along a portion of the length of said line until said diameter is greater than that value for which $$J_0\left(\frac{\pi d}{\lambda}\right)=0$$

where $J_0$ is the zero order Bessel function of the first kind, that is, $$\frac{d}{\lambda}>.77$$

where $\lambda$ is the operating wavelength, whereby propagation of the field within said shell may take place without said inner conductor, said inner conductor being tapered to a point along the next adjacent length of said line and said outer conductor thereafter along the length of said line being flared out until said field is free from said system, the flare of said shell being continued so that the end of said shell is curved back on itself.

14. A radiant energy transmission system including a hollow wave guide member having a transverse dimension such that propagation of the radiant energy field within said guide may take place without the presence of an inner conductor, said member being flared at one end to such an extent that the field within said guide is free from said system, and said flare being further continued so that the end of said guide is curved back on itself.

15. A radiant energy transmission system including a hollow wave guide member having a diameter $d$ greater than that value for which $$J_0\left(\frac{\pi d}{\lambda}\right)=0$$

where $J_0$ is the zero order Bessel function of the first kind, that is, $$\frac{d}{\lambda}>.77$$

where $\lambda$ is the operating wavelength, said member being so flared out at one end that the field within said guide is freed from said system and is propagated in all directions normal to the length of said member.

16. A radiant energy transmission system including a hollow wave guide member having a diameter $d$ greater than that value for which $$J_0\left(\frac{\pi d}{\lambda}\right)=0$$

where $J_0$ is the zero order Bessel function of the first kind, that is, $$\frac{d}{\lambda}>.77$$

where $\lambda$ is the operating wavelength, said member being flared out at one end until the field within said guide is free from said system, the flare of said guide being so continued that the end thereof is curved back on itself.

17. A system for radiating electromagnetic waves comprising a concentric transmission line having an outer shell and an inner conductor connected to a wave energy source, said inner conductor being tapered to a point entirely within said outer shell, said outer shell being flared out in a trumpet-like formation so that the field within said shell is smoothly converted to a field extending substantially uniformly in all directions normal to the axis of the flared portion of said shell.

18. In a radiant energy system, a concentric transmission line having an outer shell and an inner conductor, said outer shell being smoothly expanded in its transverse dimension along a portion of the length of said line until the propagation of the field within said shell may take place without said inner conductor, said inner conductor being tapered to a point, said outer conductor thereafter being so flared out that said field is freed from said system, said outer conductor merging smoothly into a plane conductive sheet normal to the axis of said line.

19. A radiant energy transmission system including a hollow wave guide member having a diameter $d$ greater than that value for which $$J_0\left(\frac{\pi d}{\lambda}\right)=0$$

where $J_0$ is the zero order Bessel function of the first kind, that is, $$\frac{d}{\lambda}>.77$$

where $\lambda$ is the operating wavelength, said member being so flared out at one end that the field within said guide is freed from said system, the flare of said member merging smoothly into a plane conductive sheet normal to the axis of said guide member.

PHILIP S. CARTER.

REFERENCES CITED

The following references are of record in the file of this patent:

UNITED STATES PATENTS

| Number | Name | Date |
|---|---|---|
| 2,200,023 | Dallenbach | May 7, 1940 |
| 2,207,845 | Wolff | July 16, 1940 |
| 2,235,506 | Schelkunoff | Mar. 18, 1941 |
| 2,231,602 | Southworth | Feb. 11, 1941 |
| 2,239,724 | Lindenblad | Apr. 29, 1941 |
| 2,275,646 | Peterson | Mar. 10, 1942 |
| 2,292,496 | Von Baeyer | Aug. 11, 1942 |

FOREIGN PATENTS

| Number | Country | Date |
|---|---|---|
| 494,835 | Great Britain | Nov. 1, 1938 |
| 495,977 | Great Britain | Nov. 23, 1938 |